United States Patent
Chen

(10) Patent No.: US 7,688,692 B2
(45) Date of Patent: Mar. 30, 2010

(54) OPTICAL STORAGE APPARATUS, PREAMPLIFIER AND METHOD OF GENERATING TRACKING ERROR SIGNAL THEREOF

(75) Inventor: Mu-Jung Chen, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 551 days.

(21) Appl. No.: 11/733,793

(22) Filed: Apr. 11, 2007

(65) Prior Publication Data

US 2007/0237041 A1    Oct. 11, 2007

(30) Foreign Application Priority Data

Apr. 11, 2006   (TW) .............................. 95112899 A

(51) Int. Cl.
G11B 7/00   (2006.01)
(52) U.S. Cl. ................................. 369/44.29; 369/44.35
(58) Field of Classification Search ...................... None
See application file for complete search history.

(56) References Cited

U.S. PATENT DOCUMENTS

2005/0207303 A1*   9/2005   Yonezawa ................. 369/53.19
2006/0044961 A1*   3/2006   Jin .......................... 369/44.13

* cited by examiner

*Primary Examiner*—Paul Huber
(74) *Attorney, Agent, or Firm*—Thomas, Kayden, Horstemeyer & Risley

(57) ABSTRACT

An optical storage apparatus, a preamplifier and a method of generating a tracking error signal. The optical storage apparatus includes a pickup head, a preamplifier, and a servo control. The pickup head generates radio frequency (RF) signals. The preamplifier includes a signal adjusting apparatus, a phase detector, a charge pump, and a circuit. The signal adjusting apparatus has input terminals for receiving the RF signals. At least two of the input terminals are substantially short-circuited when the optical storage apparatus is in a calibration mode. The phase detector generates control signals based on the phase differences between the radio frequency signals. The circuit generates current control signal based on the tracking error signal when the optical storage apparatus is in the calibration mode. The current magnitude of at least one of the current sources in the charge pump is determined according to the current control signal.

17 Claims, 4 Drawing Sheets

OPTICAL STORAGE APPARATUS, PREAMPLIFIER AND METHOD OF GENERATING TRACKING ERROR SIGNAL THEREOF

This application claims the benefit of Taiwan application Serial No. 95112899, filed Apr. 11, 2006, the subject matter of which is incorporated herein by reference.

BACKGROUND OF THE INVENTION

1. Field of the Invention

The invention relates in general to an optical storage apparatus, and more particularly to a preamplifier for an optical storage apparatus.

2. Description of the Related Art

An optical storage system, such as a conventional CD system or DVD system, or any other more advanced optical disc system, usually includes several functional blocks, as shown in FIG. 1. The blocks include, for example, a pickup head 108 for receiving a reflected beam from an optical disc 110, a preamplifier (preamp) 102 for receiving a number of radio frequency (RF) signals generated by the pickup head 108, a servo control 104 for receiving a control signal, such as a tracking error signal TE, generated by the preamplifier 102 and according thereto controlling the various motors of the optical disc system, and a video processor 106 for performing an image decoding process (e.g., the processing according to the MPEG4 specification), according to the information read from the optical disc, to generate a playable video signal.

When the optical drive is reading the disc, the laser beam has to be precisely impinged on a track path of the disc without offset in order to make the optical pickup head read data from the disc or write the data to the disc smoothly. The above-mentioned operation has to be performed based on the tracking error signal TE, or the value of any other signal having the same or similar function, so as to obtain a real-time tracking state, and then adjust the operation of the optical pickup head with the servo control.

Generally speaking, the tracking error signal TE is generated based on phase differences between RF signals corresponding to various areas, such as areas A, B, C, and D in FIG. 1, on the optical pickup head 108. That is, the value of the tracking error signal TE represents the phase deviations between the RF signals generated by the optical pickup head receiving the reflected beam. It is of great significance for the tracking error signal TE to faithfully reflect such phase deviations, in order to precisely perform the servo control and smoothly read the data on the optical disc.

However, non-ideal factors such as circuit mismatch caused by process variation or the path delay mismatch caused by the unsymmetrical circuit layout, often result in the value of the tracking error signal TE being not able to correctly reflect the actual phase deviations or differences in the RF signal, and consequently impose bad influences on the servo control result.

SUMMARY OF THE INVENTION

The invention is directed to an optical storage apparatus, a preamplifier, and a method of generating a tracking error signal, wherein the precision of the tracking error signal can be enhanced through calibration, which eliminates the phase shift caused in the tracking error signal by circuit mismatch.

According to a first aspect of the present invention, an optical storage apparatus is provided. The optical storage apparatus includes a pickup head, a preamplifier, and a servo control. The pickup head receives a beam reflected from an optical disc to generate a number of radio frequency (RF) signals. The preamplifier is coupled to the pickup head. The preamplifier includes a signal adjusting apparatus, a phase detector, a charge pump, and a circuit. The signal adjusting apparatus has a number of input terminals for receiving the RF signals. At least two of the input terminals of the signal adjusting apparatus are substantially short-circuited when the optical storage apparatus is in a calibration mode. The phase detector is coupled to the signal adjusting apparatus. The phase detector generates a number of control signals based on the phase differences between the radio frequency signals. The charge pump is coupled to the phase detector. The charge pump includes a number of current sources and a number of switches coupled to the current sources. The switches are controlled by the control signals to generate a tracking error signal. The circuit is coupled to the charge pump. The circuit generates at least one current control signal based on the tracking error signal when the optical storage apparatus is in the calibration mode. The current magnitude of at least one of the current sources is determined according to the current control signal. The servo control is coupled to the preamplifier and receiving the tracking error signal.

According to a second aspect of the present invention, a method of generating a tracking error signal in an optical storage apparatus is provided. The method includes the steps of: receiving a first radio frequency signal at a first input terminal, receiving a second radio frequency signal at a second input terminal, receiving a third radio frequency signal at a third input terminal, and receiving a fourth radio frequency signal at a fourth input terminal; detecting a first phase difference between the first radio frequency signal and the second radio frequency signal, and detecting a second phase difference between the third radio frequency signal and the fourth radio frequency signal; short-circuiting the first input terminal with the second input terminal and short-circuiting the third input terminal with the fourth input terminal when the optical storage apparatus is in a calibration mode, and generating the tracking error signal at an output terminal of a charge pump based on the first phase difference and the second phase difference; adjusting the current magnitude of at least one current sources in the charge pump according to the tracking error signal at the output terminal when the optical storage apparatus is in the calibration mode; and generating the tracking error signal by using the adjusted current sources in the charge pump when the optical storage apparatus is not in the calibration mode.

According to a third aspect of the present invention, a preamplifier to be disposed in an optical storage apparatus is provided. The preamplifier includes a first input terminal, a second input terminal, a third input terminal, a fourth input terminal, a first switch, a second switch, a first equalizer, a second equalizer, a third equalizer, a fourth equalizer, a phase detector, a charge pump, and a circuit. The first switch is coupled to and between the first input terminal and the second input terminal. The second switch is coupled to and between the third input terminal and the fourth input terminal. The first equalizer is coupled to the first input terminal. The second equalizer is coupled to the second input terminal. The third equalizer is coupled to the third input terminal. The fourth equalizer is coupled to the fourth input terminal. The phase detector is coupled to the first equalizer, the second equalizer, the third equalizer and the fourth equalizer. The charge pump is coupled to the phase detector. The charge pump includes a number of current sources and a number of switches coupled to the current sources. The circuit is coupled to the charge pump. The circuit generates at least one current control signal based on a tracking error signal generated by the charge pump when the first switch and the second switch are turned on, and the current control signal is outputted to the charge pump to determine the current magnitude of at least one of the current sources.

The invention will become apparent from the following detailed description of the preferred but non-limiting embodiments. The following description is made with reference to the accompanying drawings.

DETAILED DESCRIPTION OF THE INVENTION

Figure 1:
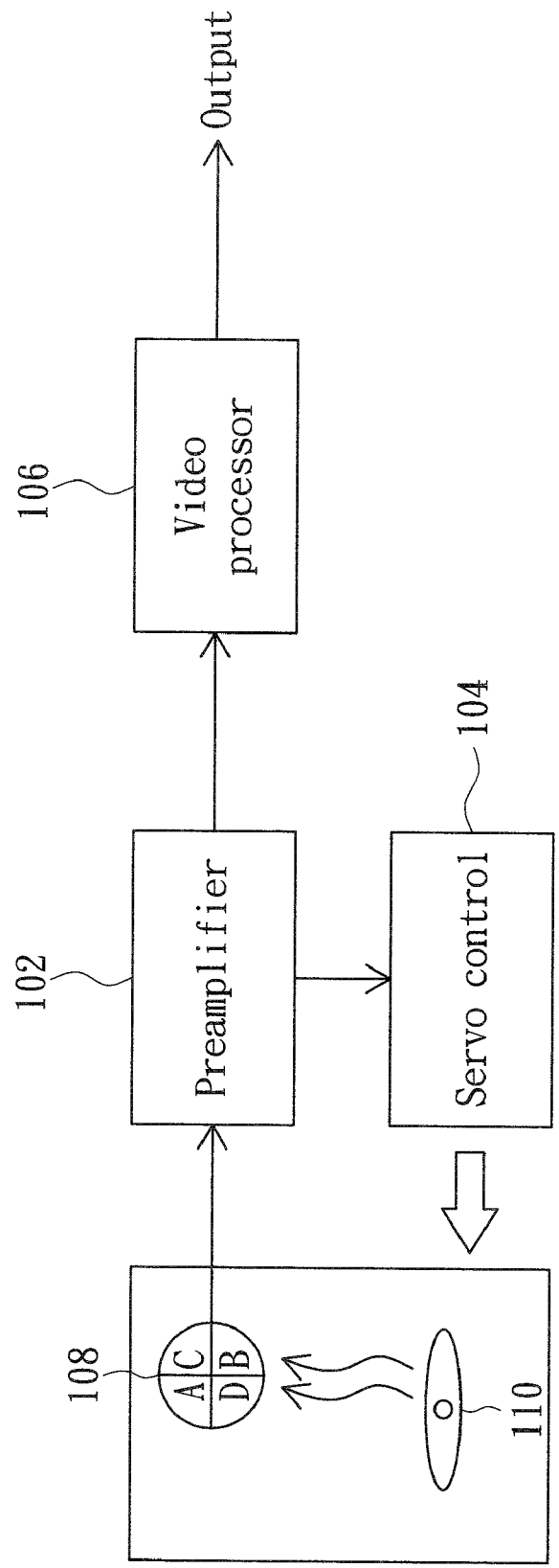
FIG. 1 (Prior Art) is a block diagram showing an optical storage system.
Figure 2:
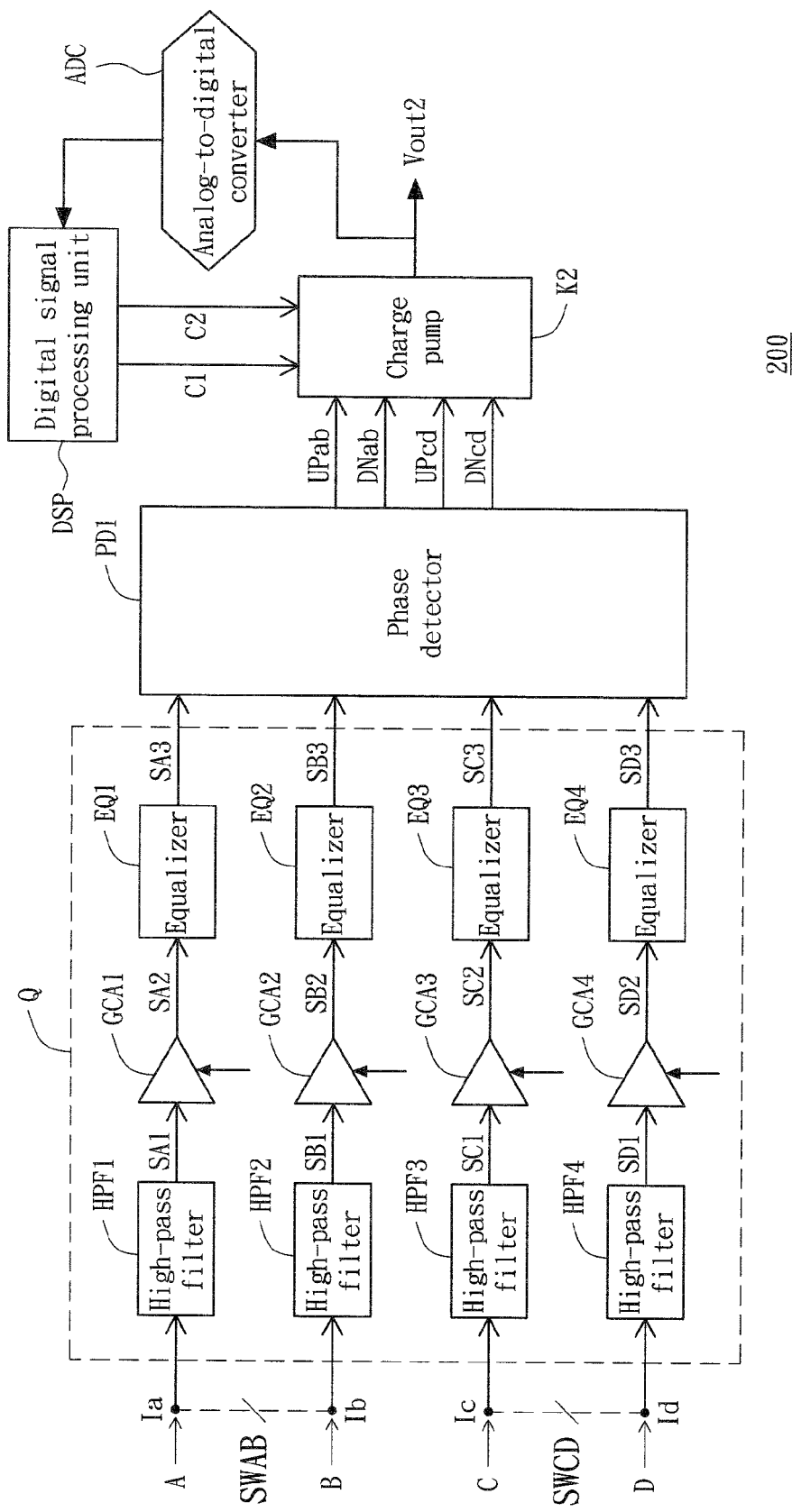
FIG. 2 is a block diagram showing a differential phase detector in an optical storage system according to a preferred embodiment of the invention.

FIG. 2 is a block diagram showing a differential phase detector in an optical storage system 200 according to a preferred embodiment of the invention. Referring to FIG. 2, the differential phase detector includes a signal adjusting apparatus Q, a phase detector PD1, and a charge pump K2, and is disposed in a preamplifier of an optical storage apparatus, for detecting phase differences among RF signals A, B, C, and D transmitted from a pickup head and thus generating a tracking error signal TE required by a servo control.

The signal adjusting apparatus Q includes high-pass filters HPF1 to HPF4, gain control amplifiers GCA1 to GCA4, equalizers EQ1 to EQ4, and input terminals Ia, Ib, Ic, and Id.

The high-pass filter HPF1 receives a signal A through an input terminal Ia and after high-pass filtering generates a signal SA1. A gain control amplifier GCA1 receives the signal SA1 and adjusts the level of the signal SA1 to generate a signal SA2. An equalizer EQ1 improves quality of the signal SA2 and then generates a signal SA3. Similarly, an adjusting path composed of HPF2, GCA2, and EQ2, an adjusting path composed of HPF3, GCA3, and EQ3, and an adjusting path composed of HPF4, GCA4, and EQ4 adjust the signals B, C, and D to generate signals SB3, SC3, and SD3, respectively.

It is to be appreciated that the functions, operating principles, and implementations of the high-pass filter, the gain control amplifier, and the equalizer in the signal adjusting apparatus Q are well know in the art associated with the optical storage technology, so details thereof will be herein omitted. People of ordinary skill in the art may also understand that the embodiment signal adjusting apparatus Q of FIG. 2 serves only as an example of the present invention, and other additions, omissions, and modifications to each of the elements are intended to fall within the protected scope of the invention.

The phase detector PD1 detects a phase difference between the signal A and the signal B based on the signal SA3 and the signal SB3, and thus outputs control signals UPab and DNab serving as detected results. The phase detector PD1 detects a phase difference between a signal C and a signal D based on the signal SC3 and the signal SD3, and thus outputs control signals UPcd and DNcd serving as the detected results. The charge pump K2 generates and outputs a signal Vout2 based on control signals UPab, DNab, Upcd, and DNcd. It is to be appreciated that the implementation of the phase detector PD1 is well known in the art, so detailed descriptions thereof will be herein omitted.

Figure 3:
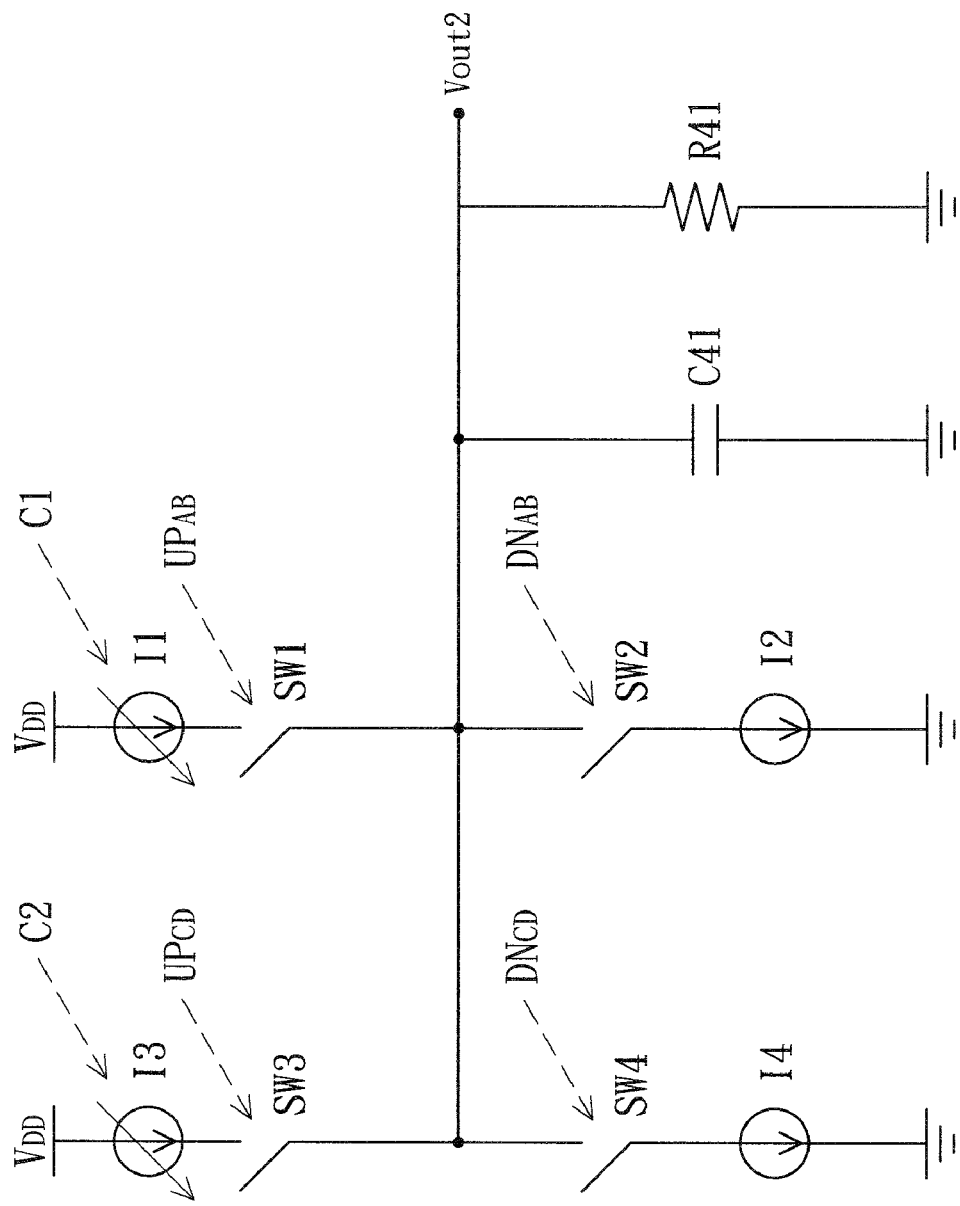
FIG. 3 is a circuit diagram showing a charge pump according to a preferred embodiment of the invention.

FIG. 3 is a circuit diagram showing the charge pump K2 according to a preferred embodiment of the invention. Referring to FIG. 3, the charge pump K2 includes current sources I1 to I4 and switches SW1 to SW4, wherein a capacitor C41 and a resistor R41 represent an equivalent RC effect of a later stage circuitry. In this embodiment, the current sources I1 to I4 are respectively coupled to an output node Vout2 through the switches SW1 to SW4 and charge/discharge the capacitor C41 when the corresponding switch turns on, so as to generate the tracking error signal TE. On/off states of the switches SW1, SW2, SW3, and SW4 are respectively controlled by the control signals Upab, DNab, Upcd, and DNcd generated by the previous stage phase detector PD1. According to such a mechanism, the preamplifier can generate the corresponding tracking error signal TE based on detected results of the phase differences between the RF signals A, B, C, and D.

In order to eliminate the inferior influence on the detected results of the phase differences between the RF signals caused by the unsymmetrical condition, such as circuit mismatch or geometrical mismatch of circuit layout, in this embodiment a switch apparatus SWAB is coupled to and between the input terminals a1 and b1, which respectively receive the RF signals A and B, of the preamplifier, and a switch apparatus SWCD is coupled to and between the input terminals c1 and d1, which respectively receive the RF signals C and D, of the preamplifier. The switch apparatuses SWAB and SWCD may be implemented by MOS transistors or other frequently used switch apparatuses.

When the optical drive is initialized, has not yet engaged in read/write operations, or at any user-specified or periodical time for calibration, a control circuit (not shown) in the optical drive generates a mode signal which turns on the switch SWAB and short-circuits the input terminals Ia and Ib, so that no phase difference exists therebetween. The control circuit also turns on the switch SWCD and short-circuits the input terminals Ia and Ib, so that no phase difference exists therebetween. By so configuring, the phase difference between the signals A and B represented by the control signals UPab and DNab now reflects the influence caused by the circuit mismatch on the phase difference; the phase difference between the signals C and D represented by the control signals UPcd and DNcd reflects the influence caused by the circuit mismatch on the phase difference; and the value of the tracking error signal TE on the output terminal Vout2 also reflects such an influence.

Consequently, the value of the tracking error signal obtained in the calibration mode can be used to adjust the configuration of the charge pump, in order to eliminate the influence from mismatch causing phase shift. In this embodiment, the optical storage system 200 further includes an analog-to-digital converter ADC for acquiring the value of the tracking error signal, converting the value of the tracking error signal into a digital value, and then transmitting the digital value to a digital signal processor DSP. The digital signal processor DSP generates corresponding control signals C1 and C2 based on the digital value, so as to adjust the configuration of the charge pump. In this embodiment, the values of the control signals C1 and C2 generated by the digital signal processor DSP can be used to adjust the value of the signal on the output terminal Vout2 to a nominal value, which is the desired value of the output terminal Vout2 in the calibration mode when no inferior influence such as the circuit mismatch exists.

Figure 4:
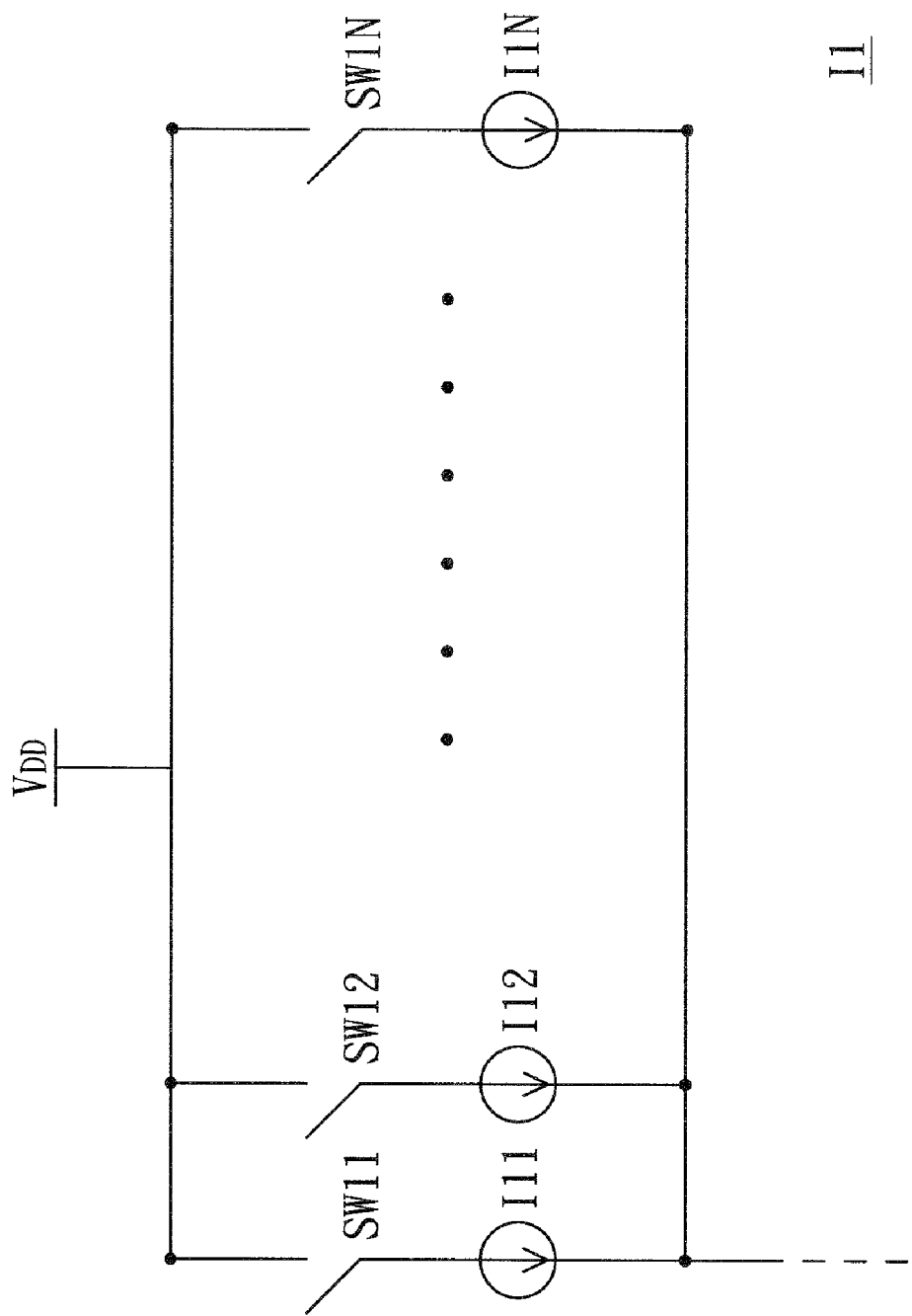
FIG. 4 is a circuit diagram showing a variable current source.

In this embodiment, the current sources I1 and I3 are variable current sources, which serve to achieve the object of controlling the value of the current for charging/discharging the capacitor C41. The control signals C1 and C2 respectively control the current magnitudes of the current sources I1 and I3. FIG. 4 is a circuit diagram showing a variable current source. As shown in FIG. 4 as an example, the current source I1 includes sub-current sources I11 to I1N and sub-switches SW11 to SW1N. The sub-current sources I11 to I1N are respectively coupled to the sub-switches SW11 to SW1N. The control signal C1 is a digital signal having N bits for respectively controlling the sub-switches SW11 to SW1N. When the number of turned-on sub-switches among the sub-switches SW11 to SW1N is greater, the output current becomes larger. The current source I3 may also have a similar configuration.

The control signals C1 and C2 may be set as the same signal. When entering the calibration mode, the values of the control signals C1 and C2 are adjusted according to the value of the signal Vout2 so that the value of the signal Vout2 is the nominal value, and the values of the control signals C1 and C2 are fixed. Thereafter, when the disc is actually written/read, the values of the control signals C1 and C2 are continuously fixed so that the currents of the current sources I1 and I3 are held constant to eliminate the phase difference contributed by the circuitry.

The control signals C1 and C2 may also be set as different signals. The control signal C1 is adjusted to calibrate the phase difference between the signals A and B caused by circuit mismatch, and the control signal C2 is adjusted based on the phase difference between the signals C and D caused by circuit mismatch. When the control signal C1 is being adjusted, the circuit path for processing the signals C and D may be set as open-circuit, or the circuit path of the signals C and D may be kept in a non-operational state. At this time, the charge pump K2 is only fed with the inputs of the control signals UPab and DNab so that the value of the control signal C1 may be adjusted, and the influence caused by the circuitry on the phases of the signals A and B may be eliminated. When the signals C and D is being calibrated, the circuit path for processing the signals A and B may be set as open-circuit, or the circuit path of the signals A and B may be kept in a non-operational state. At this time, the charge pump K2 is only fed with the inputs of the control signals UPcd and DNcd so that the value of the control signal C2 may be adjusted, and the influence caused by the circuitry on the phases of the signals C and D may be eliminated.

In this embodiment, the current sources I1 and I3 are variable current sources. In the practical circuit design, however, the current source I2 may be a variable current source controlled by the control signal to adjust the value of the current, or the current sources I1 and I2 may both be variable current sources for respectively receiving different control signals so that the phase shift occurred when the differential phase detector is processing the signals A and B may be adjusted.

As for the current sources I3 and I4, the current source I4 may be a variable current source controlled by the control signal to adjust the value of the current. Also, the current sources I3 and I4 may both be variable current sources for respectively receiving different control signals to adjust the phase shift occurred when the differential phase detector is processing the signals C and D.

If the current sources I2 and I4 are variable current sources, the current sources I2 and I4 may receive the same control signal so that the currents thereof are adjusted. The current sources I2 and I4 may alternatively receive different control signals so that the currents thereof may be respectively adjusted in a manner similar to that performed when the current sources I1 and I3 are variable current sources. Other circuit combinations may be easily derived according to the descriptions mentioned hereinabove, and detailed descriptions thereof will be omitted.

The differential phase detector and the charge pump thereof according to the embodiment of the invention may eliminate the time delay caused by and inherent in the circuitry based on the fine adjustment at initialization. Thus, the precision of the tracking error signal may be enhanced, and the data read/write error caused by the incapability of precise tracking operation when the disc is being read/written can be avoided.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical storage apparatus, comprising:
   a pickup head for receiving a beam reflected from an optical disc to generate a plurality of radio frequency (RF) signals;
   a preamplifier, coupled to the pickup head, the preamplifier comprising:
      a signal adjusting apparatus, having a plurality of input terminals for receiving the RF signals, at least two of the input terminals of the signal adjusting apparatus being substantially short-circuited when the optical storage apparatus is in a calibration mode;
      a phase detector, coupled to the signal adjusting apparatus, the phase detector generating a plurality of control signals based on the phase differences between the radio frequency signals;
      a charge pump, coupled to the phase detector, the charge pump comprising a plurality of current sources and a plurality of switches coupled to the current sources, the switches being controlled by the control signals to generate a tracking error signal; and
      a circuit, coupled to the charge pump, the circuit generating at least one current control signal based on the tracking error signal when the optical storage apparatus is in the calibration mode, the current magnitude of at least one of the current sources being determined according to the current control signal; and
   a servo control, being coupled to the preamplifier and receiving the tracking error signal.

2. The apparatus according to claim 1, wherein the at least one of the current sources comprises a plurality of sub-current sources and a plurality of sub-switches respectively coupled to the sub-current sources, and the current control signal turns on or turns off the sub-switches individually.

3. The apparatus according to claim 2, wherein the circuit comprises an analog-to-digital converter for converting the value of the tracking error signal into a corresponding digital value.

4. The apparatus according to claim 1, wherein the signal adjusting apparatus comprises a plurality of high-pass filters for high-pass filtering the RF signals respectively.

5. The apparatus according to claim 4, wherein the signal adjusting apparatus further comprises a plurality of amplifiers for amplifying the RF signals respectively.

6. The apparatus according to claim 5, wherein the signal adjusting apparatus further comprises a plurality of equalizers for equalizing the RF signals respectively.

7. A method of generating a tracking error signal in an optical storage apparatus, the method comprising the steps of:
  receiving a first radio frequency signal at a first input terminal, receiving a second radio frequency signal at a second input terminal, receiving a third radio frequency signal at a third input terminal, and receiving a fourth radio frequency signal at a fourth input terminal;
  detecting a first phase difference between the first radio frequency signal and the second radio frequency signal, and detecting a second phase difference between the third radio frequency signal and the fourth radio frequency signal;
  short-circuiting the first input terminal with the second input terminal and short-circuiting the third input terminal with the fourth input terminal when the optical storage apparatus is in a calibration mode, and generating the tracking error signal at an output terminal of a charge pump based on the first phase difference and the second phase difference;
  adjusting the current magnitude of at least one current sources in the charge pump according to the tracking error signal at the output terminal when the optical storage apparatus is in the calibration mode; and
  generating the tracking error signal by using the adjusted current sources in the charge pump when the optical storage apparatus is not in the calibration mode.

8. The method according to claim 7, further comprising the step of:
  low-pass filtering the received first to fourth radio frequency signals respectively.

9. The method according to claim 8, further comprising the step of:
  amplifying the received first to fourth radio frequency signals respectively.

10. The method according to claim 9, further comprising the step of:
  equalizing the received first to fourth radio frequency signals respectively.

11. The method according to claim 7, further comprising the step of:
  analog-to-digital converting the value of the tracking error signal at the output terminal.

12. The method according to claim 7, wherein the current source comprising a plurality of sub-current sources and a plurality of sub-switches respectively coupled to the sub-current sources, and the step of adjusting comprises:
  turning on or turning off the sub-switches individually according to the tracking error signal.

13. A preamplifier to be disposed in an optical storage apparatus, the preamplifier comprising:
  a first input terminal;
  a second input terminal;
  a third input terminal;
  a fourth input terminal;
  a first switch coupled to and between the first input terminal and the second input terminal;
  a second switch coupled to and between the third input terminal and the fourth input terminal;
  a first equalizer coupled to the first input terminal;
  a second equalizer coupled to the second input terminal;
  a third equalizer coupled to the third input terminal;
  a fourth equalizer coupled to the fourth input terminal;
  a phase detector coupled to the first equalizer, the second equalizer, the third equalizer and the fourth equalizer;
  a charge pump coupled to the phase detector, the charge pump comprising a plurality of current sources and a plurality of switches coupled to the current sources; and
  a circuit, coupled to the charge pump, the circuit generating at least one current control signal based on an tracking error signal generated by the charge pump when the first switch and the second switch are turned on, and the current control signal is outputted to the charge pump to determine the current magnitude of at least one of the current sources.

14. The preamplifier according to claim 13, wherein at least one of the current sources comprises a plurality of sub-current sources and a plurality of sub-switches respectively coupled to the sub-current sources, and the current control signal turns on or turns off the sub-switches individually.

15. The preamplifier according to claim 14, wherein the circuit comprises an analog-to-digital converter for converting the value of the tracking error signal to a corresponding digital value.

16. The preamplifier according to claim 13, further comprising a plurality of high-pass filters respectively coupled to and between the corresponding input terminals and the equalizers.

17. The preamplifier according to claim 16, further comprising a plurality of amplifiers respectively coupled to and between the corresponding high-pass filters and the equalizers.

* * * * *